Aug. 22, 1950 — D. BUCCICONE — 2,519,434
NUTTING MACHINE
Filed Sept. 4, 1947
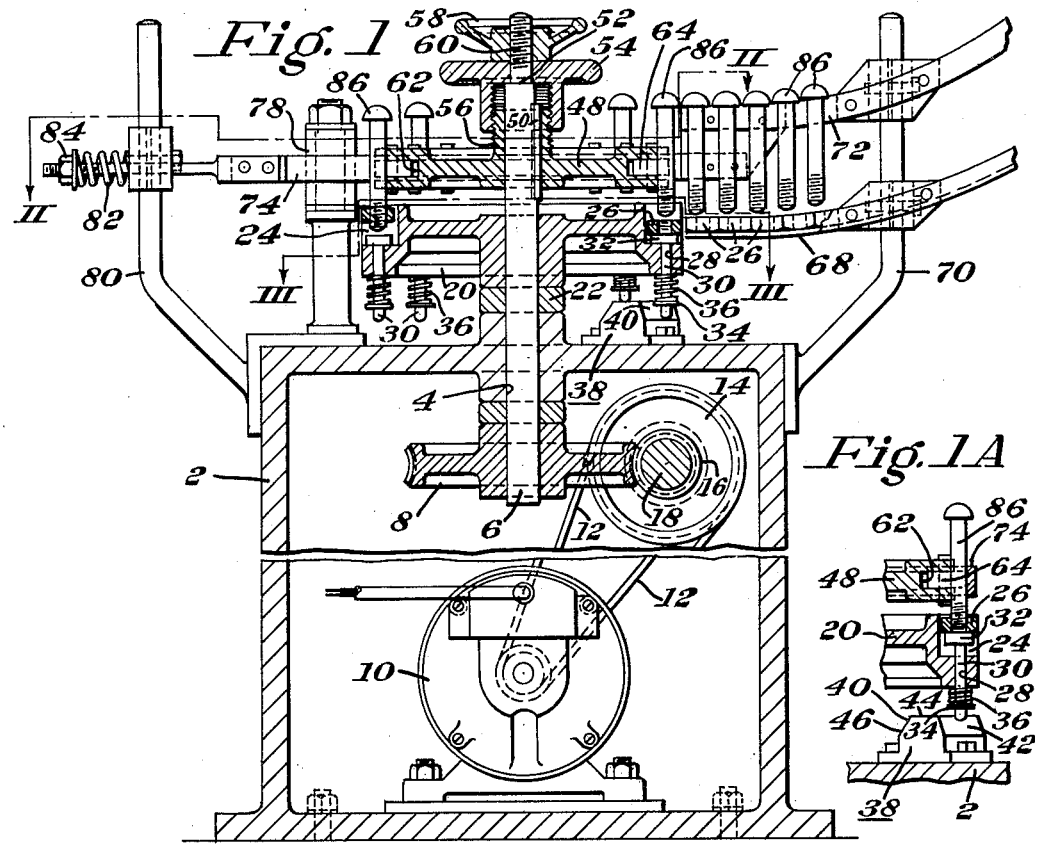
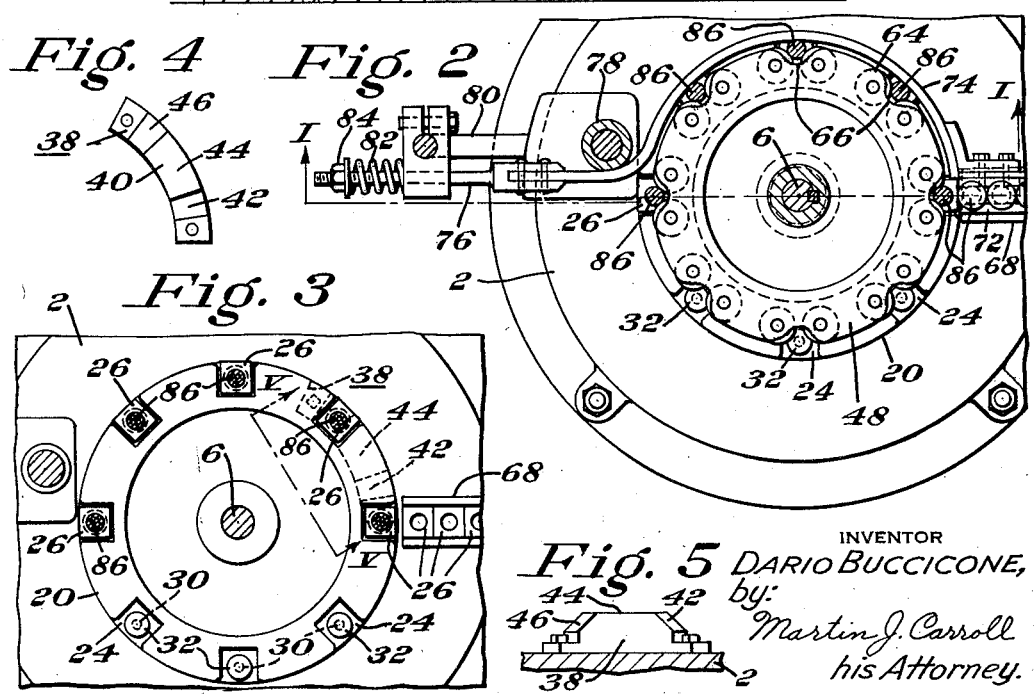
INVENTOR
DARIO BUCCICONE,
by: Martin J. Carroll
his Attorney.

Patented Aug. 22, 1950

2,519,434

UNITED STATES PATENT OFFICE 2,519,434

NUTTING MACHINE

Dario Buccicone, Gary, Ind.

Application September 4, 1947, Serial No. 772,119

10 Claims. (Cl. 10—155)

This invention relates to a nutting machine and more particularly to a device for threading nuts on bolts. It is common practice to sell bolts with the nuts assembled thereon and various types of devices have been provided for this purpose. However, these devices are relatively expensive and complicated so that the operation is often performed by hand.

It is an object of my invention to provide a nutting machine which is simple and inexpensive.

This and other objects will be more apparent after referring to the following specification and attached drawings in which:

Figure 1 is a vertical sectional view taken on the line I—I of Figure 2;

Figure 1A is a fragmentary view similar to Figure 1 showing the nut in engagement with the bolt;

Figure 2 is a sectional view taken on the line II—II of Figure 1;

Figure 3 is a sectional view taken on the line III—III of Figure 1;

Figure 4 is a plan view of the nut raising cam; and

Figure 5 is a view taken on the line V—V of Figure 3.

Referring more particularly to the drawings, the reference numeral 2 indicates a suitable stand for supporting the nutting machine. Extending through an opening 4 in the top of the stand 2 is a vertically disposed rotatable spindle 6 having a worm gear 8 rigidly fastened to the lower end thereof. The worm gear 8 is driven by a motor 10 mounted in the stand 2, through the belt 12, pulley 14 and worm 16, the worm 16 and pulley 14 being mounted on a shaft 18 suitably mounted for rotation in bearings (not shown) supported by the stand 2. A circular chuck 20 is fastened to spindle 6 for rotation therewith. The thrust and weight of the spindle assembly is absorbed by the bearing 22. The chuck 20 has a plurality of openings 24 around its periphery which are of suitable dimensions to receive the nuts 26, but which will prevent the nuts from turning about their axis. In the bottom of each recess is an axial opening 28 for receiving a pin 30 having an enlarged head 32 extending into the opening 24 and a collar 34 at the lower end thereof. A spring 36 surrounds the pin 30 between the collar 34 and the bottom of the chuck 20. Mounted on the top of the stand 2 is a cam 38 having a cam track 40 thereon. As best shown in Figures 4 and 5, the cam track 40 is provided with a rise portion 42, a dwell portion 44 and a fall portion 46.

A circular magazine 48 is keyed to the spindle 6 above chuck 20 by means of the key 50. A shoulder 52 is provided at the top of the spindle 6 and a nut 54 is supported thereon. The magazine 48 is provided with a threaded hub portion 56 which is engaged by the nut 54. A lock nut 58 is threaded on the threaded top portion 60 of the spindle 6 to lock the magazine 48 in adjusted vertical position. The periphery of the magazine 48 is bifurcated to provide a recess 62 in which is mounted a plurality of spaced apart rotatable rollers 64. The rollers 64 are arranged in pairs as best shown in Figure 2, and the periphery of the magazine 48 is preferably cut back at 66 between the pairs of rollers. The outermost parts of the rollers are at least even with the periphery of the magazine 48. The axis of each of the nut receiving recesses 24 is in a plane normal to and bisecting the plane through the axes of each pair of rollers.

A nut feeder 68 is supported by a bracket 70 attached to the stand 2 and directly above it is a bolt feeder 72 also attached to bracket 70. The feeders 68 and 72 may be of any suitable standard type.

As best shown in Figure 2, a semi-resilient band 74 with one end fastened to the bolt feeder 72 extends around a considerable portion of the periphery of the magazine 48 with the opposite end thereof being fastened to a threaded rod 76. A roll 78 is fastened to the stand 2 and bears against the outside of the semi-resilient band 74. The threaded rod 76 is supported by means of a bracket 80 attached to the stand 2. The outer end of the rod is surrounded by a spring 82 which bears against the bracket 80 and a nut 84 threaded on the outer part of the rod 76.

In operation the vertical position of the magazine 48 is determined by the length of the bolts 86 and it is positioned in this position by means of the nut 54. The chuck 20 and magazine 48 are then rotated in unison by means of the motor 10. As their peripheries simultaneously pass the feeders 68 and 72 a single nut 26 from feeder 68 is fed into recess 24 and a single bolt 86 from feeder 72 is fed into the corresponding space between a pair of rollers 64. Almost immediately the bolt now entered between rollers 64 will be held in place by the band 74. The rollers 64 and the bolt will be rotated by the frictional contact that the bolt makes against the band 74. At the same time the bottom of the pin 30 will contact the cam portion 42 and will be raised upwardly to portion 44, this causing the nut 26 to contact the threads on the roll turning bolts and become engaged therewith. (See Figure 1A.) The pin 30 will then be retracted to its lower portion by the action of spring 36. Since the nut is prevented from turning by the sides of the recess 24, the rotating motion of the bolt causes the nut to thread upwardly thereon until the bolt passes beyond the confines of band 74, at which time the bolt and nut being no longer confined by the band 74 will be free to topple over and drop from the machine. This operation is continuously repeated as long as feeders 68 and 72 are provided with nuts and bolts. It will be seen that the tension on the band 74 may be varied by means of the spring 82 and bolt 84 so that different diameter bolts may be provided with nuts.

While one embodiment of my invention has been shown and described, it will be apparent that other adaptations and modifications may be made without departing from the scope of the following claims.

I claim:

1. A nutting machine comprising a chuck mounted for rotation on its vertical axis, said chuck having a plurality of nut receiving recesses around the periphery thereof, said recesses being of such size as to receive said nuts but to prevent rotation thereof, a magazine mounted above said chuck coaxially therewith, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, a stationary band extending from said bolt feeder around a substantial portion of the periphery of said magazine, said band being spaced from said rollers so that the bolts bear against the rollers and band, means for rotating the magazine and chuck in synchronism, and means for raising the nuts into engagement with said bolts during initial travel of said nuts in said chuck, said bolts being rotated during rotation of said magazine by contact with said band.

2. A nutting machine comprising a chuck mounted for rotation on its vertical axis, said chuck having a plurality of nut receiving recesses around the periphery thereof, said recesses being of such size as to receive said nuts but to prevent rotation thereof, a magazine mounted above said chuck coaxially therewith, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, a stationary semi-resilient band extending from said bolt feeder around a substantial portion of the periphery of said magazine, a roll for keeping the band spaced from said rollers so that the bolts bear against the rollers and band, means for rotating the magazine and chuck in synchronism, and means for raising the nuts into engagement with said bolts during initial travel of said nuts in said chuck, said bolts being rotated during rotation of said magazine by contact with said band.

3. A nutting machine comprising a chuck mounted for rotation on its vertical axis, said chuck having a plurality of nut receiving recesses around the periphery thereof, said recesses being of such size as to receive said nuts but to prevent rotation thereof, a magazine mounted above said chuck coaxially therewith, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, a stationary semi-resilient band extending from said bolt feeder around a substantial portion of the periphery of said magazine, a roll for keeping the band spaced from said rollers so that the bolts bear against the rollers and band, spring pressed means for adjusting the tension on said band, means for rotating the magazine and chuck in synchronism, and means for raising the nuts into engagement with said bolts during initial travel of said nuts in said chuck, said bolts being rotated during rotation of said magazine by contact with said band.

4. A nutting machine comprising a chuck mounted for rotation on its vertical axis, said chuck having a plurality of nut receiving recesses around the periphery thereof, said recesses being of such size as to receive said nuts but to prevent rotation thereof, a magazine mounted above said chuck coaxially therewith, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, means for adjusting the distance between said magazine and chuck, a stationary semi-resilient band extending from said bolt feeder around a substantial portion of the periphery of said magazine, a roll for keeping the band spaced from said rollers so that the bolts bear against the rollers and band, spring pressed means for adjusting the tension on said band, means for rotating the magazine and chuck in synchronism, and means for raising the nuts into engagement with said bolts during initial travel of said nuts in said chuck, said bolts being rotated during rotation of said magazine by contact with said band.

5. A nutting machine comprising a vertical shaft, a circular chuck fastened on said shaft for rotation therewith, said chuck having a plurality of nut receiving recesses around the periphery thereof, said recesses being of such size as to receive said nuts but to prevent rotation thereof, a circular magazine fastened on said shaft above said chuck for rotation with said shaft, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, a stationary band extending from said bolt feeder around a substantial portion of the periphery of said magazine, said band being spaced from said rollers so that the bolts bear against the rollers and band, means for rotating the shaft, and means for raising the nuts into engagement with said bolts during initial travel of said nuts in said chuck, said bolts being rotated during rotation of said magazine by contact with said band.

6. A nutting machine comprising a vertical shaft, a circular chuck fastened on said shaft for rotation therewith, said chuck having a plurality of nut receiving recesses around the periphery thereof, said recesses being of such size as to receive said nuts but to prevent rotation thereof, a circular magazine fastened on said shaft above said chuck for rotation with said shaft, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, a stationary band extending from said bolt feeder around a substantial portion of the periphery of said magazine, said band being spaced from said rollers so that the bolts bear against the rollers and band, spring pressed means for adjusting the tension on said band, means for rotating the shaft, and means for raising the nuts into engagement with said bolts during initial travel of said nuts in said chuck, said bolts being rotated during rotation of said magazine by contact with said band.

7. A nutting machine comprising a vertical shaft, a circular chuck fastened on said shaft for rotation therewith, said chuck having a plurality of nut receiving recesses around the periphery thereof, said recesses being of such size as to receive said nuts but to prevent rotation thereof, a circular magazine fastened on said shaft above said chuck for rotation with said shaft, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, a stationary semi-resilient band extending from said bolt feeder around a substantial portion of the periphery of said magazine, a roll for keeping the band spaced from said rollers so that the bolts bear against the rollers and band, means for rotating the shaft, and means for raising the nuts into engagement with said bolts during initial travel of said nuts in said chuck, said bolts being rotated during rotation of said magazine by contact with said band.

8. A nutting machine comprising a vertical shaft, a circular chuck fastened on said shaft for rotation therewith, said chuck having a plurality of nut receiving recesses around the periphery thereof, said recesses being of such size as to receive said nuts but to prevent rotation thereof, a circular magazine fastened on said shaft above said chuck for rotation with said shaft, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder for feeding nuts successively to each nut receiving recess, a feeder for feeding bolts successively to said magazine, means for adjusting the distance between said magazine and chuck, a stationary semi-resilient band extending from said bolt feeder around a substantial portion of the periphery of said magazine, a roll for keeping the band spaced from said rollers so that the bolts bear against the rollers and band, spring pressed means for adjusting the tension on said band, means for rotating the shaft, and means for raising the nuts into engagement with said bolts during initial travel of said nuts in said chuck, said bolts being rotated during rotation of said magazine by contact with said band.

9. A nutting machine comprising a chuck mounted for rotation on its vertical axis, said chuck having a plurality of nut receiving recesses around the periphery thereof, said recesses being of such size as to receive said nuts but to prevent rotation thereof, a magazine mounted above said chuck coaxially therewith, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder adjacent said nut receiving recess for feeding nuts successively thereto, a feeder adjacent said magazine for feeding bolts successively thereto, a stationary band extending from said bolt feeder around a substantial portion of the periphery of said magazine, said band being spaced from said rollers so that the bolts bear against the rollers and band, means associated with said machine for rotating the magazine and chuck in synchronism, and means adjacent the nut receiving recess for raising the nuts into engagement with said bolts during initial travel of said nuts in said chuck, said bolts being rotated during rotation of said magazine by contact with said band.

10. A nutting machine comprising a chuck mounted for rotation on its vertical axis, said chuck having a plurality of nut receiving recesses around the periphery thereof, said recesses being of such size as to receive said nuts but to prevent rotation thereof, a magazine mounted above said chuck coaxially therewith, a plurality of spaced apart rotatable rollers mounted on the periphery of said magazine and extending to the edge thereof, the axis of each of the nut receiving recesses being in a plane normal to and bisecting the plane through the axes of each pair of rollers, a feeder adjacent said nut receiving recess for feeding nuts successively thereto, a feeder adjacent said magazine for feeding bolts successively thereto, a stationary semi-resilient band extending from said bolt feeder around a substantial portion of the periphery of said magazine, a roll adjacent said band for keeping the band spaced from said rollers so that the bolts bear against the rollers and band, means associated with said machine for rotating the magazine and chuck in synchronism, and means adjacent the nut receiving recess for raising the nuts into engagement with said bolts during initial travel of said nuts in said chuck, said bolts being rotated during rotation of said magazine by contact with said band.

DARIO BUCCICONE.

REFERENCES CITED

The following references are of record in the file of this patent:

UNITED STATES PATENTS

| Number | Name | Date |
| --- | --- | --- |
| 1,274,562 | Hull | Aug. 6, 1918 |
| 1,598,392 | Risser | Aug. 31, 1926 |